US009224105B2

(12) United States Patent
Cornelius et al.

(10) Patent No.: US 9,224,105 B2
(45) Date of Patent: Dec. 29, 2015

(54) METHOD AND SYSTEM OF AUTOMATICALLY DOWNLOADING MEDIA CONTENT IN A PREFERRED NETWORK

(71) Applicant: concept.io, Inc., Cupertino, CA (US)

(72) Inventors: Chris Cornelius, Cupertino, CA (US); Dominic James Doran Hughes, Menlo Park, CA (US); Georgios Sofianatos, San Francisco, CA (US); Gurumurthy D. Ramkumar, Palo Alto, CA (US); Max Delgadillo, Cupertino, CA (US)

(73) Assignee: concept.io, Inc., Cupertino, CA (US)

( * ) Notice: Subject to any disclaimer, the term of this patent is extended or adjusted under 35 U.S.C. 154(b) by 0 days.

(21) Appl. No.: 14/070,583

(22) Filed: Nov. 4, 2013

(65) Prior Publication Data
US 2015/0074022 A1    Mar. 12, 2015

Related U.S. Application Data

(63) Continuation-in-part of application No. 13/954,942, filed on Jul. 30, 2013, which is a continuation-in-part of application No. 13/761,420, filed on Feb. 7, 2013.

(60) Provisional application No. 61/716,540, filed on Oct. 21, 2012.

(51) Int. Cl.
G06F 15/18       (2006.01)
G06N 99/00       (2010.01)
H04L 29/08       (2006.01)
G06F 17/30       (2006.01)

(52) U.S. Cl.
CPC ........ *G06N 99/005* (2013.01); *G06F 17/30861* (2013.01); *H04L 67/06* (2013.01)

(58) Field of Classification Search
None
See application file for complete search history.

(56) References Cited

U.S. PATENT DOCUMENTS

| 6,947,922 | B1  |   | 9/2005 | Glance |         |
|-----------|-----|---|--------|--------|---------|
| 7,409,336 | B2  |   | 8/2008 | Pak    |         |
| 8,463,036 | B1  | * | 6/2013 | Ramesh et al. | 382/170 |
| 8,538,965 | B1  |   | 9/2013 | Talyansky |     |

(Continued)

OTHER PUBLICATIONS

ES&IS: Enhanced Spread and Iterative Search hardware-friendly motion estimation algorithm for the HEVC Standard Sanchez, G.; Zatt, B.; Porto, M.; Agostini, L. Electronics, Circuits, and Systems (ICECS), 2013 IEEE 20th International Conference on Year: 2013 pp. 941-944, DOI: 10.1109/ICECS.2013.6815567.*

(Continued)

*Primary Examiner* — Michael B Holmes
(74) *Attorney, Agent, or Firm* — Blank Rome LLP

(57) ABSTRACT

In one exemplary aspect, a sorted list of scored media content episodes is received with a computing device of a user. Each respective media content episode is scored by an iterative autotuning prediction algorithm, and wherein each element of the sorted list of scored media content episodes comprises a value that represents a likelihood of a user listening to the respective media content episode and a reference to a location of the respective media content episode. A number of bytes of a download iteration for each media content episode is determined based on value that represents a likelihood of the user listening to the respective media content episode and an index of the respective media content episode in the sorted list. It is detected that a mobile device is in the preferred network. The download iteration is implemented for each media content episode when it is detected that the mobile device is in the preferred network.

20 Claims, 9 Drawing Sheets

(56) References Cited

U.S. PATENT DOCUMENTS

| | | | |
|---|---|---|---|
| 8,582,821 B1* | 11/2013 | Feldman et al. | 382/107 |
| 8,644,610 B1* | 2/2014 | Ramkumar et al. | 382/176 |
| 8,733,650 B1* | 5/2014 | Segal et al. | 235/437 |
| 8,738,647 B2* | 5/2014 | Menon et al. | 707/770 |
| 8,756,216 B1* | 6/2014 | Ramesh et al. | 707/711 |
| 8,762,552 B2* | 6/2014 | Ramkumar et al. | 709/229 |
| 8,787,679 B1* | 7/2014 | Ramesh et al. | 382/203 |
| 8,825,612 B1* | 9/2014 | Ruzon et al. | 707/694 |
| 8,943,090 B2* | 1/2015 | Dhua et al. | 707/769 |
| 8,990,199 B1* | 3/2015 | Ramesh et al. | 707/736 |
| 9,104,700 B1* | 8/2015 | Ramkumar et al. | 1/1 |
| 2009/0216741 A1 | 8/2009 | Thrall | |
| 2009/0248672 A1 | 10/2009 | McIntire | |
| 2010/0030764 A1 | 2/2010 | Koren | |
| 2010/0100516 A1 | 4/2010 | Zhou | |
| 2010/0262658 A1 | 10/2010 | Mesnage | |
| 2010/0325126 A1 | 12/2010 | Rajaram | |
| 2012/0066618 A1 | 3/2012 | Barker | |
| 2012/0278342 A1 | 11/2012 | Purdy | |
| 2013/0159081 A1 | 6/2013 | Shastry | |
| 2013/0212178 A1 | 8/2013 | Krishnamurthy | |
| 2013/0332965 A1 | 12/2013 | Seyller | |
| 2014/0101142 A1 | 4/2014 | Gomezuribe | |
| 2014/0115082 A1 | 4/2014 | Korst | |
| 2014/0129500 A1 | 5/2014 | Nice | |
| 2014/0298385 A1 | 10/2014 | Roberts | |
| 2014/0358911 A1 | 12/2014 | McCarthy | |
| 2014/0379460 A1 | 12/2014 | Schein | |
| 2015/0074022 A1* | 3/2015 | Cornelius et al. | 706/12 |
| 2015/0141123 A1 | 5/2015 | Callaway | |

OTHER PUBLICATIONS

Combinational Seabed Terrain Matching Algorithm Basing on Probability Data Associate Filtering and Iterative Closest Contour Point Jiang Fan; Wu Yi-meng; Zhang Zhen-shan; Zhan Wu Intelligent Computation Technology and Automation, 2009. ICICTA '09. Second International Conference on Year: 2009, vol. 1 pp. 245-249, DOI: 10.1109/ICICTA.2.*

A Recursive Frequency Estimator Using Linear Prediction and a Kalman-Filter-Based Iterative Algorithm Zhang, Z.G.; Chan, S.C.; Tsui, K.M. Circuits and Systems II: Express Briefs, IEEE Transactions on Year: 2008, vol. 55, Issue: 6 pp. 576-580, DOI: 10.1109/TCSII.2007.916837 Referenced in: IEEE Journals & Magazine.*

BP Neual Network Based on Improved BFGS Algorithm in the Virtual Speed Prediction of Bio-mimetic Robotic Horse Ren Yuyan; Wang Hongrui; Bao Jie Intelligent Computation Technology and Automation (ICICTA), 2010 International Conference on Year: 2010, vol. 1 pp. 887-890, DOI: 10.1109/ICICTA.2010.440.*

Bell, R.M. et al., "The BellKor solution to the Netflix prize," 2007, 15 pages.

Dror, G., "Web-scale media recommendation systems," Proceedings of the IEEE, 100(9), 2722-2736, Date of Publication: May 31, 2012, Issue Date: Sep. 2012, DOI: 10.1109/JPROC.2012.2189529.

Flaxman, A.D., et al., "Online convex optimization in the bandit setting: gradient descent without a gradient," Proceedings of the sixteenth annual ACM-SIAM symposium on Discrete algorithms, Society for Industrial and Applied Mathematics, 10 pages.

Koren, Y., et al., "Advances in collaborative filtering," Chapter 5 of Recommender systems handbook, Springer US, 2011, 145-186, DOI: 10.1007/978-0-387-85820-3_5.

Rendle, S., "Learning recommender systems with adaptive regularization," Proceedings of the fifth ACM international conference on Web search and data mining, ACM, DOI: 10.1145/2124295. 2124313.

Solodov, M.V., "Incremental gradient algorithms with stepsizes bounded away from zero," Computational Optimization and Applications, 11(1), 23-35, DOI: 10.1023/A:1018366000512.

Ten Hagen, S., et al., "Exploration/exploitation in adaptive recommender systems," proceedings of Eunite 2003, 37 pages.

* cited by examiner

| |
|---|
| 0$^{TH}$ – CURRENTLY PLAYING |
| 1$^{ST}$ INDEX – SCORE 0.83 |
| 2$^{ND}$ INDEX – SCORE 0.80 |
| 3$^{RD}$ INDEX – SCORE 0.75 |
| 4$^{TH}$ INDEX – SCORE 0.70 |
| 5$^{TH}$ INDEX – SCORE 0.60 |
| 6$^{TH}$ INDEX – SCORE 5.9 |
| 7$^{TH}$ INDEX – SCORE 0.58 |
| ⋮ |

MEDIA CONTENT LIST 300

FIGURE 3

METHOD AND SYSTEM OF AUTOMATICALLY DOWNLOADING MEDIA CONTENT IN A PREFERRED NETWORK

CROSS-REFERENCE TO RELATED APPLICATIONS

This application is a continuation-in-part of and claims the benefit of U.S. application Ser. No. 13/954,942 filed Jul. 30, 2013. U.S. application Ser. No. 13/954,942 is a continuation-in-part of and claims the benefit of U.S. application Ser. No. 13/761,420 filed Feb. 7, 2013 which in turn claims priority to U.S. provisional patent application No. 61/716,540 filed on Oct. 21, 2012. These applications are incorporated herein by reference.

BACKGROUND

1. Field

This application relates generally to media content, and more specifically to a system, article of manufacture and method for automatically downloading media content in a preferred network.

2. Related Art

Conventional methods of delivering media for individuals may involve substantial user effort to identify potential media content and/or to select media content to access. For example, a user may be required to perform a plurality of searches of the Internet to locate media content of interest. Additionally, a user may listen to media while not in a preferred network (e.g. a Wi-Fi network). The user may skip through a play list. Media content tracks can take time to download and/or buffer. Accordingly, improvements may be made over conventional methods of selecting or delivering media.

BRIEF SUMMARY OF THE INVENTION

In one aspect, a sorted list of scored media content episodes is received with a computing device of a user. Each respective media content episode is scored by an iterative autotuning prediction algorithm, and wherein each element of the sorted list of scored media content episodes comprises a value that represents a likelihood of a user listening to the respective media content episode and a reference to a location of the respective media content episode. A number of bytes of a download iteration for each media content episode is determined based on value that represents a likelihood of the user listening to the respective media content episode and an index of the respective media content episode in the sorted list. It is detected that a mobile device is in the preferred network. The download iteration is implemented for each media content episode when it is detected that the mobile device is in the preferred network.

Optionally, a base number of bytes for each media content episode in the sorted list can be determined. The base number of bytes of a download iteration for each media content episode can include the value that represents a likelihood of the user listening to the respective media content episode multiplied by the index of the respective media content episode in the sorted list and the base number of bytes variable.

In another aspect, a sorted media content playlist comprising a first media content track and a second media content track is provided to a computing device. A base number of bytes value is provided. A first alpha score is determined for the first media content track. The first alpha score includes a likelihood of a user of the computing device listening to the first media content track. A first beta score is determined for the first media content track. The first beta score is derived from an index of the first media content tract in the sorted list. A first number of bytes to download for the first media track is calculated using the product of the base number of bytes value, the first alpha score and the first beta score. A second alpha score is determined for the second media content track. The second alpha score is a likelihood of the user of the computing device listening to the second media content track. A second beta score is determined for the second media content track. The second beta score is derived from an index of the second media content tract in the sorted list. A second number of bytes to download for the second media track is calculated using the product of the base number of bytes value, the second alpha score and the second beta score. A maximum number of bytes value is provided. The maximum number of bytes value represents a maximum number of total bytes to download for both the first media content track and second media content track in a media content download operation. It is detected that the computing device has accessed a preferred computer network. When it is detected that the computing device has accessed the preferred computer network the media content download operation is implemented until the maximum number of bytes value has been reached or the first number of bytes to download for the first media track and the second number of bytes to download for the second media track have been downloaded.

Optionally, the step of detecting that the computing device has accessed a preferred computer network can be performed once in a specified period of time (e.g. every ten seconds). The likelihood of the user of the computing device listening to the first media content track and the likelihood of the user of the computing device listening to the second media content track determined by a process of iteratively autotuning a set of specified prediction parameters associated with the user with a media content recommendation system.

BRIEF DESCRIPTION OF THE DRAWINGS

The present application can be best understood by reference to the following description taken in conjunction with the accompanying figures, in which like parts may be referred to by like numerals.

FIG. 3 depicts, in block diagram format, an example media content list, according to some embodiments.

Figure 1:
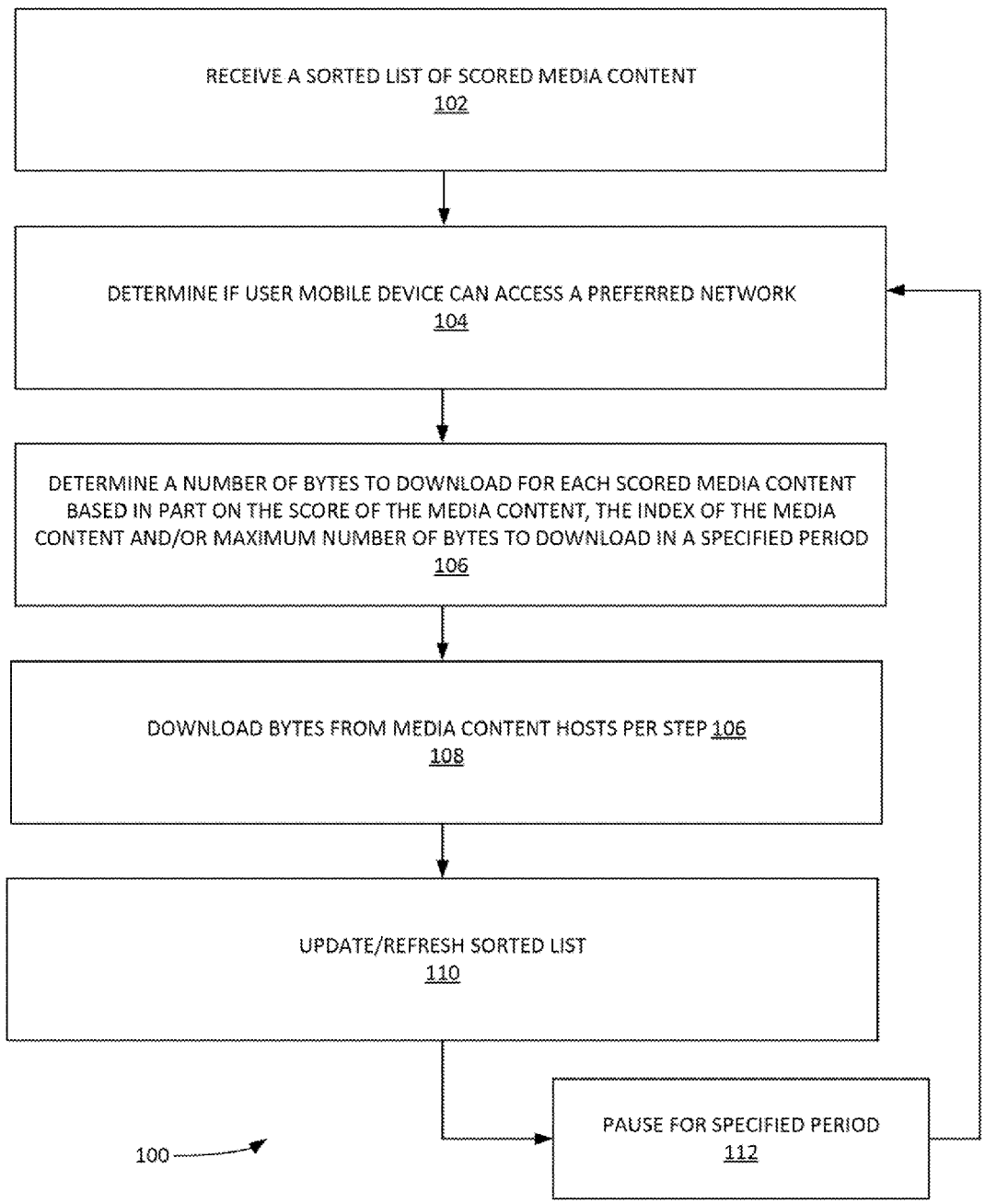
FIG. 1 depicts, in block diagram format, a process of downloading media content in a preferred media network, according to some embodiments.

The Figures described above are a representative set, and are not an exhaustive with respect to embodying the invention.

DETAILED DESCRIPTION

Disclosed are a system, method, and article of downloading media content in a preferred media network. The following description is presented to enable a person of ordinary skill in the art to make and use the various embodiments. Descriptions of specific devices, techniques, and applications are provided only as examples. Various modifications to the examples described herein may be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Exemplary Processes

FIG. 1 depicts, in block diagram format, a process 100 of downloading media content in a preferred media network, according to some embodiments. In step 102 of process 100, a sorted list of scored media content is received. For example, the sorted list can be received by a media player application in a mobile device (e.g. a smart phone, a head-mounted computing system, a tablet computer, a smart watch and the like). Example media content sources can include news and information audio/video sources (e.g. NPR®, audio/visual weblogs, podcasts, online educational content (e.g. iTunes® university and the like), traffic reports, weather reports, local news content, etc.). The sorted list can be sorted according to various factors, such as how likely a user is to listen to the media content track. Accordingly, the score of a media content track can represent a value of a likelihood that a user may listen to the media content track (e.g. a score value can be from 0 to 1). Additionally, metadata information about the can also be obtained. For example, metadata information from a media content producing entity can be obtained. Additionally, metadata information from the entity that scored and/or sorted the media content (e.g. based on a media content recommendation service). In one example, the media content recommendation service can score media content based on such factors as The algorithm can evaluate media content with a formula that combines various factors as: an expert rating (e.g. a rating and/or metadata assigned to the program by an expert human curator); a user rating (a particular user's judgment of the program inferred from how long the user listened to episodes of the program); a content rating (e.g. a measure of how closely the content and topic matches a user's interests), a community rating (e.g. the media content application's user community's overall judgment of the content) and/or a peer rating (e.g. a judgment of the media content by other users similar to the user). It is noted that example recommendation and/or scoring algorithms are provided in U.S. patent application Ser. Nos. 13/761,420 and 13/954,942 and are incorporated herein for use in example embodiments. The sorted list can include pointers to host entities (e.g. host web servers) for each media content track. The media content application can contact each host entity to download portions of the media content.

In step 104 of process, it can be determined if a user's mobile device can access a preferred network. In one example, a preferred network can include a computer network and/or set of computer networks which are known to have no data limitations for the current user (e.g. due to data quotas or cost). For example, a preferred network can be Wi-Fi network (e.g. a wireless network that allows the user's mobile device to exchange data and/or connect to the Internet wirelessly using radio waves). A Wi-Fi can be a wireless local area network (WLAN) on the Institute of Electrical and Electronics Engineers' (IEEE) 802.11 standards. However, these examples are offered by way of example and not of limitation as other networks can be utilized depending on the type of mobile device and/or its options for connecting to the Internet (e.g. via a local Ethernet network, via a cellular data network with an unlimited mobile Internet access, etc.).

If the user's mobile device is determined to be in a preferred network, process 100 can then proceed to step 106. In step 106, a number of bytes to download is determined for each track of the scored media content in the sorted playlist. The number of bytes to download can be based, in part, on a score for the media content track, the index of the media content track in the sorted playlist, a configurable base number of bytes variable, a maximum number of bytes to download in a specified period (and/or other preconfigured limitations on the downloading process). Additional examples and/or metrics for step 106 are provided infra.

In step 108, the number of bytes for each media content determined in step 106 can be downloaded. Step 108 can be performed while the user's mobile device remains connected to a preferred network. In the event the user's mobile device is detected to no longer be connected to a preferred network, step 108 can be paused. It is noted that upon resumption of step 108, in some examples, the sorted list can be updated and process 100 move to an applicable step (e.g. step 110). Furthermore, in some examples, step 108 can be paused if a metric, such as maximum number of bytes to download in a specified period is reached. In step 110, the sorted playlist can be updated and process 100 can return to an earlier step for another iteration. A media content track that included already downloaded bytes may be partially downloaded and another download operation in a subsequent iteration of 100 can download additional media content track data. Process 100 can be set to be performed based on a timer (e.g. every n-seconds, every ten (10) seconds, etc.) and/or other queue-based factors. For example, in step 112, process 100 can be paused for a specified period before returning to step 104. In some examples, step 112 can be performed between step 108 and 110 in lieu of between steps 110 and 104. Process 100 can be iteratively repeated such that each iteration can add an additional portion of a respective media content file (e.g. an mp3 file for a podcast).

Figure 2:
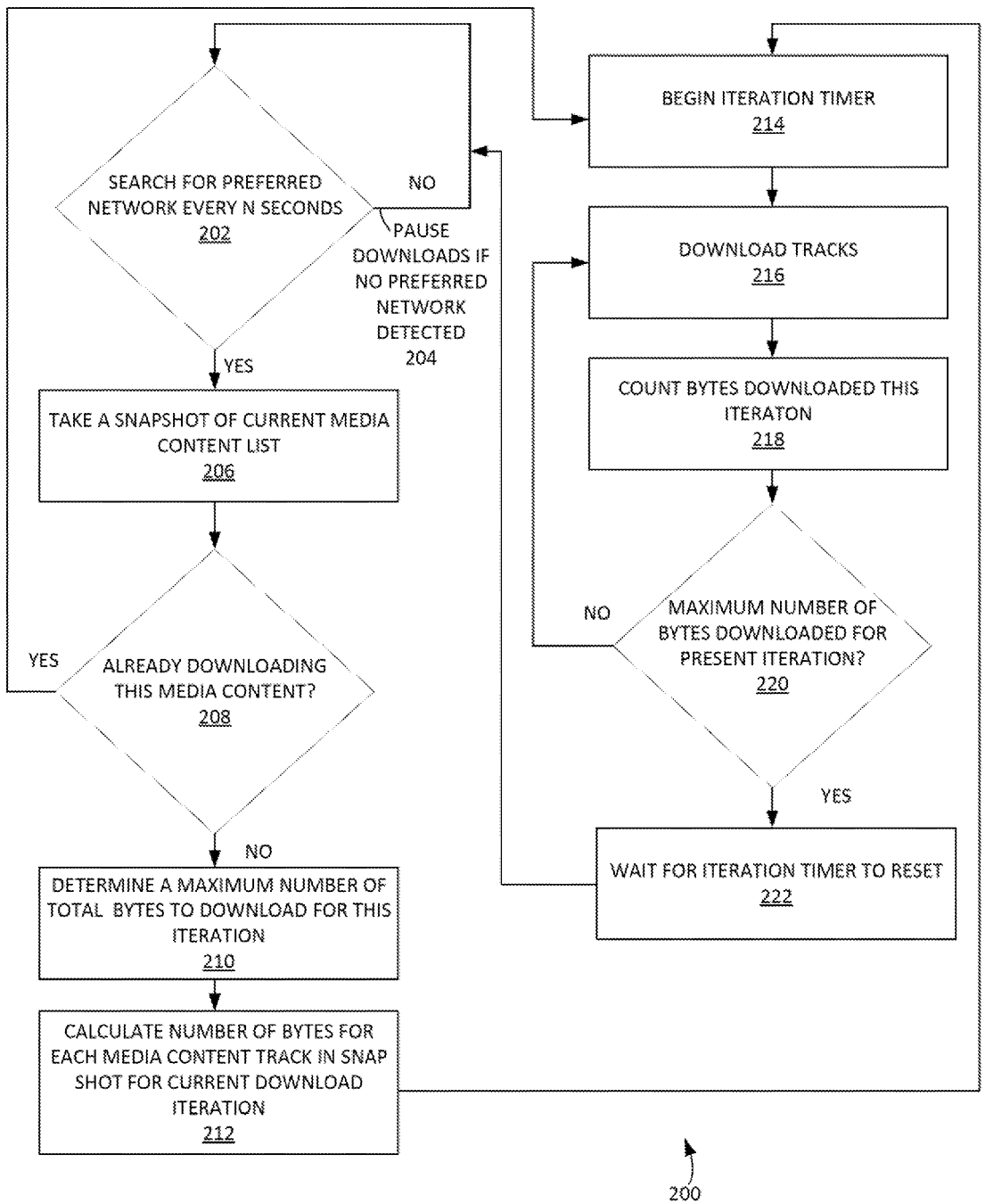
FIG. 2 illustrates a process of obtaining media content for a media content application operative in a mobile device, according to some embodiments

FIG. 2 illustrates a process 200 of obtaining media content for a media content application operative in a mobile device, according to some embodiments. In step 202, a search for a preferred network is performed every n-seconds (e.g. every 10 (ten) seconds). It the preferred network is not detected then process 200 can wait for n-seconds to pass and then re-perform step 202. Additionally, process 200 can pause current downloads of media content in step 204 (e.g. until a preferred network is once again detected). When a preferred network is detected, then process 200 can proceed to step 206. In step 206, a snapshot of a current media content list (e.g. the sorted list of process 100) is taken. The snapshot can be periodically updated by a media content application (e.g. the Swell® application) operating in the user's mobile device. The snapshot can be managed and populated by a media content server. In step 208, it is determined whether media content (e.g. a podcast track) is already begun download (e.g. in a previous iteration of process 200 during an earlier coupling with another preferred network and the like). The snapshot may not be modified for the remaining steps of process 200 until process 200 returns to step 206 in a subsequent iteration.

If it is determined that the media content is already been partially downloaded, then process 200 proceeds to step 214. It is noted that not all partially downloaded media content may continue to step 214. For example, a partially-downloaded news podcast track may no longer be in the snapshot (e.g. may be removed by the media content recommendation service). In this case, the partially-downloaded news podcast track may be removed from the any download queue and its currently downloaded bytes removed from the media content application's data storage.

If it is determined that the media content has not already been partially downloaded, then process 200 proceeds to step 210. In step 210, a maximum number of bytes to download for this iteration of process 200 is determined. The iteration can be a specified period and/or condition for which any downloads of media content are to be performed. If it is detected that the specified period has elapsed and/or a condition has been satisfied, then any downloads associated with the particular iteration of process 200 can be paused. An example condition can be detecting that a maximum number of bytes set for the iteration has been downloaded. Examples of the values of the maximum number of bytes can be two-hundred and fifty megabytes (MB), five hundred (500) MB, and the like. In one example, if a 3G cellular data network is included as a preferred network then the maximum number of bytes can be set to a lower value (e.g. 1 MB). The values of the maximum number of bytes to download for this iteration can be configurable (e.g. based on certain conditions of the mobile device such as network usage and/or conditions of the preferred network). In other examples, the value of the maximum number of bytes can be set according to an average size of the media content tracks in the current media content list. In another example, the calculation of the value of the maximum number of bytes can be influenced by the speed of the detected preferred network.

In step 212, a number of bytes to download for each media content in the snapshot can be calculated for the current iteration of process 200. In this way, a media content track that a user is more likely to listen to (e.g. listed higher in the media content list of the snapshot) can have more bytes downloaded in an iteration than another media content track the user is less likely to listen to. Thus, the number of bytes number of bytes to download for each media content in the snapshot can vary according to user and/or recommender metrics (e.g. such as those provided supra). Accordingly, various formulas can be used to calculate the number of bytes to download for each media content in the snapshot can be calculated for the current iteration of process 200. In one example, an $\alpha$-score and a $\beta$-score can be determined for each media content track. The number of bytes to download for each media content can be based on an equation such as: the $\alpha$-score times the $\beta$-score times a configurable base number of bytes variable (e.g. 10 MB, 20 MB 50 MB, etc.).

The $\alpha$-score can be a score provided for the media content track according to the scoring algorithms (e.g. as provided in U.S. patent application Ser. Nos. 13/761,420 and 13/954,942 (incorporated by reference herein) and/or as provided in the discussion of FIGS. 6, 7 and/or 9 herein). For example, a media content recommendation algorithm can determine that a user has a 90% chance of listening to a particular media content track. Accordingly, this media content track can receive a 0.9 $\alpha$-score. In some examples, various weighting factors can be provided as coefficients to modify the effect of the $\alpha$-score in the equation. The $\beta$-score can be based on the index (e.g. the integer value of the position media content track in the media content list) of the media content track in the sorted media content list. For example, the second media content track can have an index of 2 and a $\beta$-score of ½ equals 0.5. It is noted that in some examples, the current media track can be set as a zeroth ($0^{th}$) media content track in the index and receive a separate downloading prioritization than those provided by process 200. The currently played media track can also download data based on another set of priorities and rules (e.g. on non-preferred networks as well). Moreover, a minimum threshold number of bytes to download for a media content can be set. A download my not be performed if number of bytes to download for a particular media content falls below minimum threshold (e.g. one hundred (100) KB). Consequently, media content tracks lower in the media content list may not have associated download operations for an iteration of process 200.

In step 214, an iteration timer is started. The iteration timer can be set to s specified period (e.g. sixty (60) seconds). Upon completion of the iteration time (and/or some other condition), the iteration can be reset. In step 216, the media content tracks are downloaded. The number of bytes for each download can be tracked and counted for the iteration in step 218. In step 220, it is determined if a maximum number of bytes has been downloaded for the present iteration. If no, then the iteration's downloads can continue. If yes, then the iteration downloads can be paused until the iteration timer is completed and reset in step 222. Process 200 can then return to step 202. It is noted that step 202 can be repeated in parallel to the other steps of process 200 such that step 204 can be implemented at any point in process 200 in the even that no preferred network is detected. Process 200 can be iteratively repeated such that each iteration can add an additional portion of a respective media content file (e.g. percentage of bytes of an mp3 file for a podcast).

FIG. 3 depicts, in block diagram format, an example media content list 300, according to some embodiments. Media content list 300 can include an index that denotes each member media content track. Media content list 300 can include a zeroth index of a currently playing media content track (e.g. see 504 in FIG. 5). This media content track can have a different downloading priority than the remaining indexed media content tracks (e.g. $1^{st}$ through $n^{th}$). For example, the $1^{st}$ media content track can be 508 in FIG. 5. The automating downloading configuration of the $1^{st}$ through $n^{th}$ media content tracks can be based on the methods and systems provided herein (e.g. processes 100 and 200). Each media content track can also have a score that represents a likelihood that a user may listen to the media content track (e.g. see the system and methods of FIGS. 6, 7 and/or 9 infra). Media content list 300 can be ordered based on each media content track's score. The index, score and other variables such as a configured base number of bytes variable can be utilized to determine a number of bytes of each media content track to pre-download prior to the media content track becoming the zeroth indexed track in the media content list 300. It is noted that media content list 300 can be dynamically updated by a media content recommendation system.

Figure 4:
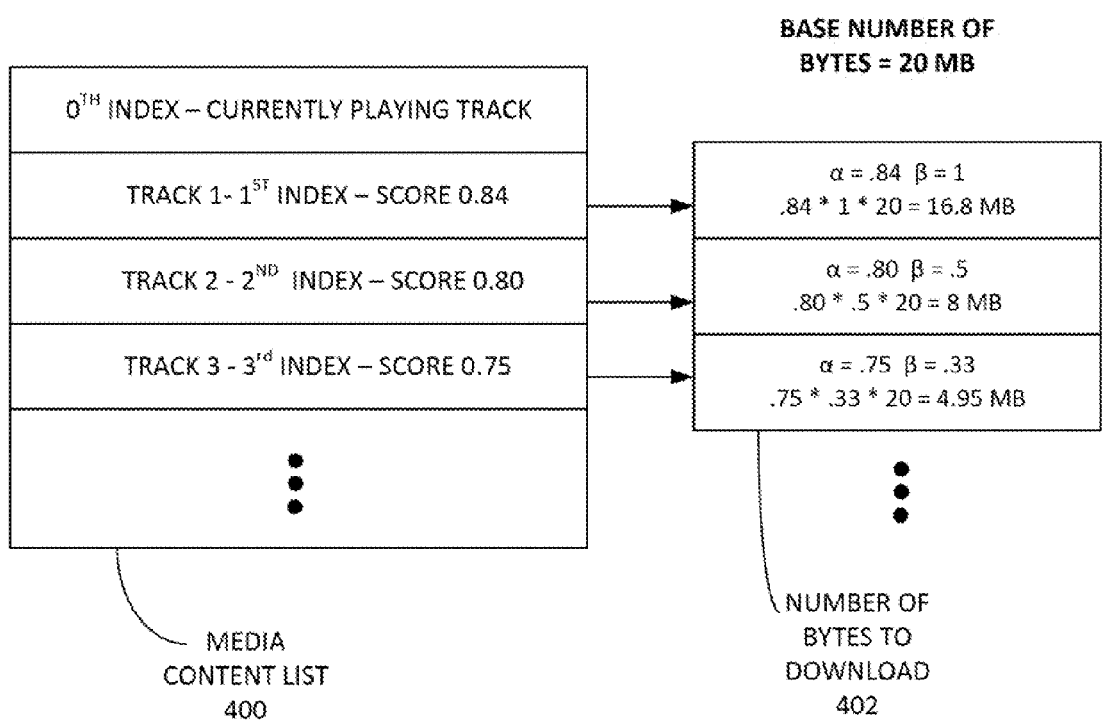
FIG. 4, a media content list and concomitant number of bytes to download for each track, according to some embodiments.

FIG. 4, a media content list 400 and concomitant number of bytes to download for each track 402, according to some embodiments. In one example, a value for the configurable base number of bytes variable can be set to twenty (20) MB. An α-score for each track can be derived for each track based on a score that represents a likelihood that the user may listen to the track. A β-score can be calculated for each track based on the index of the track. A product of the α-score, the β-score and/or the configurable base number of bytes variable can be calculated as shown in concomitant number of bytes to download for each track box 402. When a preferred network is detected, the download for each respective track can be implemented and managed by a media content application operative in the user's mobile device (e.g. as provided in process 200). It is noted that media content list 400 be dynamically updated and the α-score, and/or β-score for a media content track modified accordingly. The number of bytes to download calculated in FIG. 4 can be for an iteration of a download process (e.g. an iteration of process 200).

Figure 5:
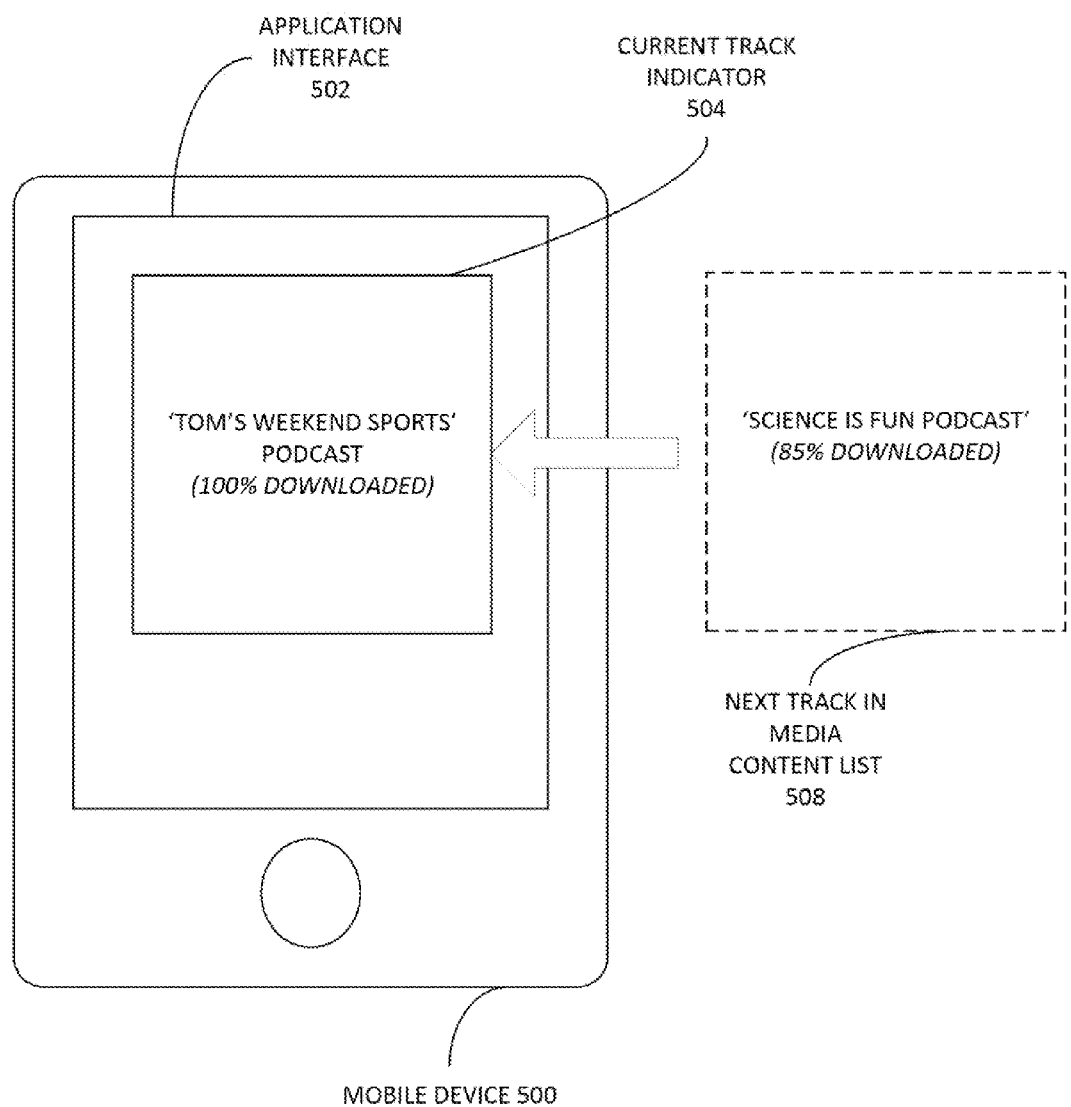
FIG. 5 illustrates an example of a mobile device displaying a media content application interface on a user device as a next media content to be played, according to some embodiments.

FIG. 5 illustrates an example of a mobile device 500 displaying a media content application interface 502 as well as a next media content 508 to be played, according to some embodiments. Mobile device 500 can include a media content application for playing media content to a user. The media content application can utilize an application interface 502 to display a current track indicator 504. Current track indicator can provide information about the currently played media content track. In the present example, the current media content track has been completely downloaded (e.g. as indicated by the italicized text which may or may not be displayed to the user). In the event the current media content track is not completely downloaded, the remaining bytes in the media file can be downloaded on either a preferred and/or not preferred computer network. Media content application can obtain a score list of media content tracks to be played after the current media content track (e.g. in the event of a completion of the current media track and/or a track navigation event). In FIG. 4, the next track to be played 508 is presented symbolically as a broken-lined box. It is noted that the various processes and system presented herein can pre-download a portion of the next track to be played 508 (e.g. eighty percent (80%)) based on such factors as the likelihood the user will listen to track 508 (e.g. as determined by a media content recommendation system).

Exemplary Environment and Architecture

Figure 6:
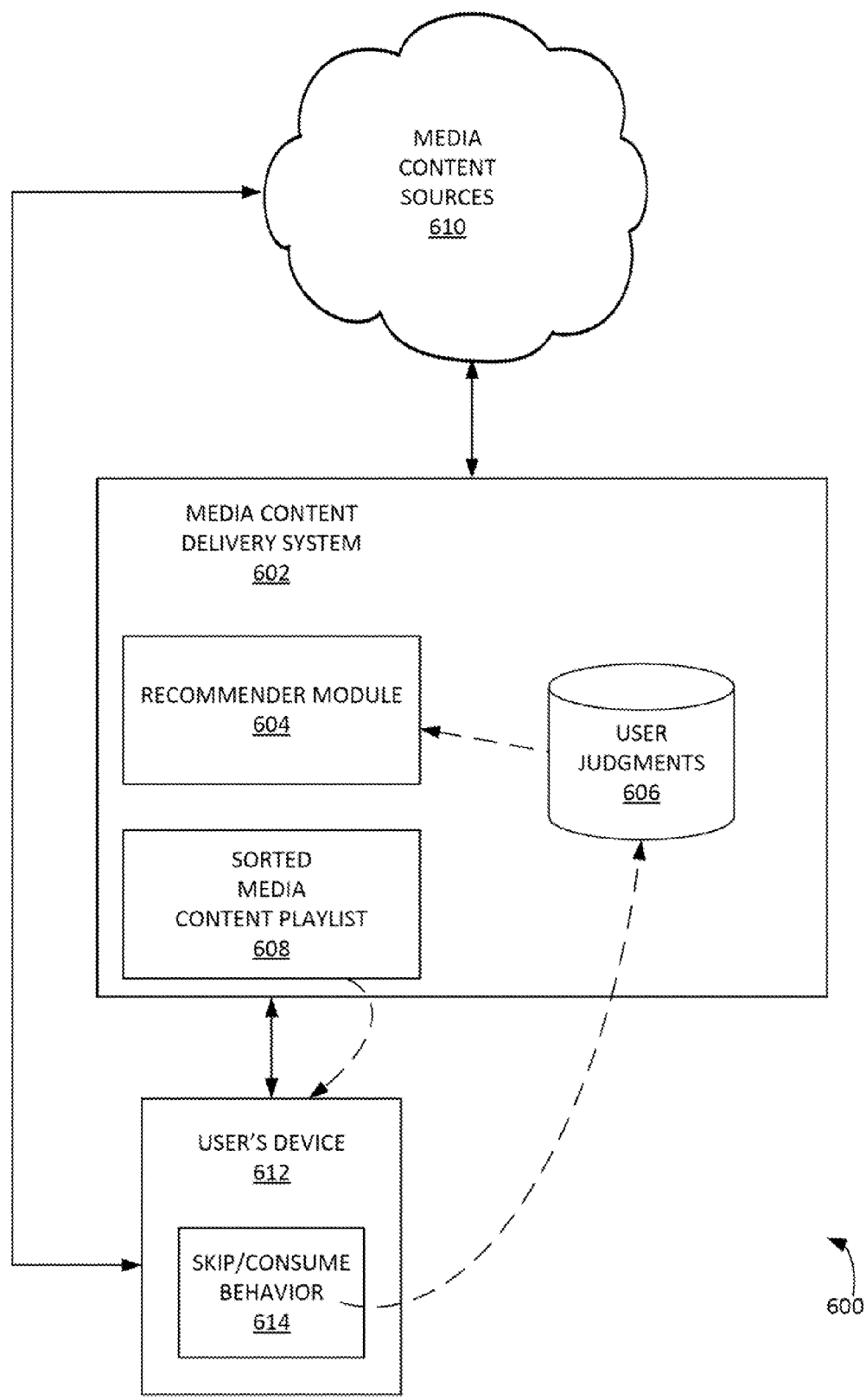
FIG. 6 depicts, in block diagram format, an example system for personalized delivery of media content, according to some embodiments.

FIG. 6 depicts, in block diagram format, an example system 600 for personalized delivery of media content, according to some embodiments. System 600 includes media-content delivery system 602. Media-content delivery system 602 can obtain data from various sources such as media content sources 610, a user's device 612 (e.g. a tablet computer, a smart phone, a head-mounted computing system, etc.). Media-content delivery system 602 can utilize this data to score and/or rank media content based on various factors such as a user's skip/consume behavior 614 with respect to already provided media content, user judgments 606 (e.g. scored and weighted values derived from user's skip/consume behavior 614), prediction analysis of simulations of user behavior (e.g. as performed by recommender module 606), and the like. It is noted that media-content delivery system 602 may not store the media content itself. Rather, media-content delivery system 602 can provide pointer data to media content sources in a sorted media content playlist 608.

Recommender module 604 can perform various prediction analysis techniques to determine the content and/or ranking of media content playlist 608. Recommender module 604 can iteratively perform simulations of user skip/listening behavior and autotune the prediction parameters of the simulations based on various machine-learning optimization techniques. Recommender module 604 can obtain user judgments 606. Recommender module 604 can determine one or more 'best' prediction parameters for a user by comparing simulation outcomes with user judgments 606 (e.g. prediction parameters that provided a lowest cost in a simulation). These 'best' prediction parameters can then be utilized in determining the content and/or ranking of media content playlist 608. In this way, media content playlist 608 can be dynamically generated and/or sorted with media content the user is more likely to consume to completion appearing before media content the user is less likely to consume to completion. In some embodiments, system 600 can be implemented in a server environment. In some embodiments, system 600 can be implemented in a cloud-computing environment.

Figure 7:
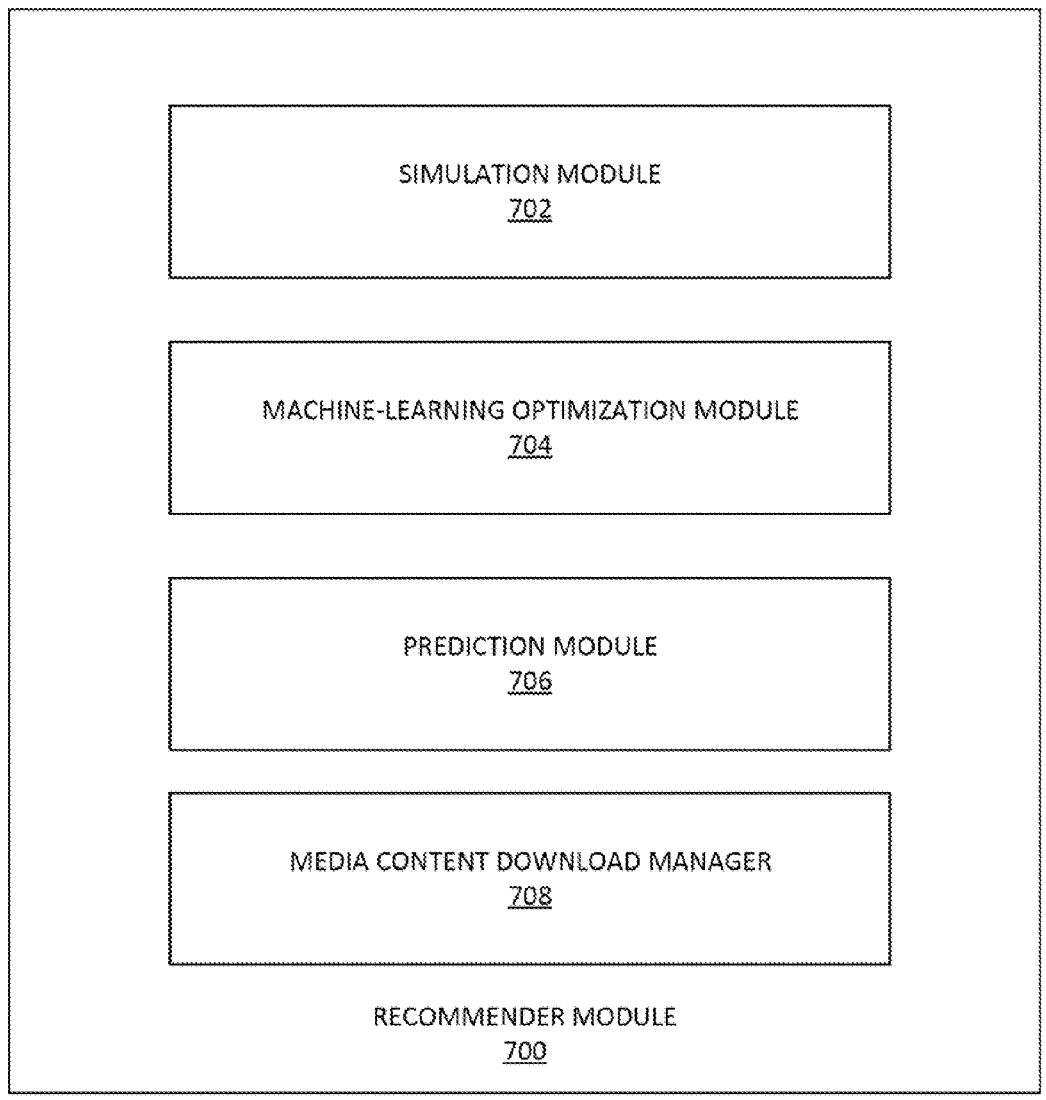
FIG. 7 illustrates, in block diagram format, an example recommender module, according to some embodiments.

FIG. 7 illustrates, in block diagram format, an example recommender module 700, according to some embodiments. Simulation module 702 can perform a set of simulations of a user's skip/listen behavior with respect a particular media content. Simulation module 702 can use a particular prediction parameter configuration for each simulation. Machine-learning optimization module 704 can utilize machine-learning optimization methods (e.g. a stochastic gradient decent method) to configure the prediction parameter values of each simulation. Simulation module 702 can compare a simulation's prediction score with historical user skip/listen behavior and calculate a prediction error for the simulation. Prediction errors can be utilized to determine a prediction parameter configuration with a lowest cost. Accordingly, prediction module 706 can utilize the prediction errors to select a certain set of prediction parameters and utilize the set of prediction parameters to predict future user skip/listen behavior, user media content preferences, and the like. This information can be used to select and/or sort future media content for the user. Prediction module 706 can provide a score for each media content track that represents a likelihood that a user may listen to the media content track. Media content download manager 708 can manage the downloading of media content tracks. For example, media content download manager 708 can determine an α-score and/or a β-score for each media content track in a media content playlist. Media content manager 708 can calculate the product of the α-score, the β-score and/or the configurable base number of bytes variable to determine a number of bytes to pre-download for a particular media content track when a user's mobile device is determined to have access to a preferred network. Media content manager 708 can implement and manage processes 100 and/or 200. Media content download manager 708 can provide a downloader functionality for each media content track and download bytes in parallel and/or in sequence based on various system preferences. In various embodiments, recommender module 700 can be implemented in a media content recommender enterprise server and/or partially in a local user device (e.g. media content download manager 708). In some examples, portions of recommender module 700 can be implemented in a cloud-computing environment. In some examples, the base number of bytes variable can be a value less than a maximum number of bytes per minute variable. The base number of bytes variable can be used in a formula for computing the number of bytes to download for a particular media content track. This number can be selected such that, if the α-value and/or the β-value in the formula were both one (1) (e.g., it is the next track in the queue that is estimated with a one-hundred percent (100%) confidence that the user may listen to the entire track), base number of bytes variable can then indicate the reasonable number of bytes that should be downloaded for the first track.

Figure 8:
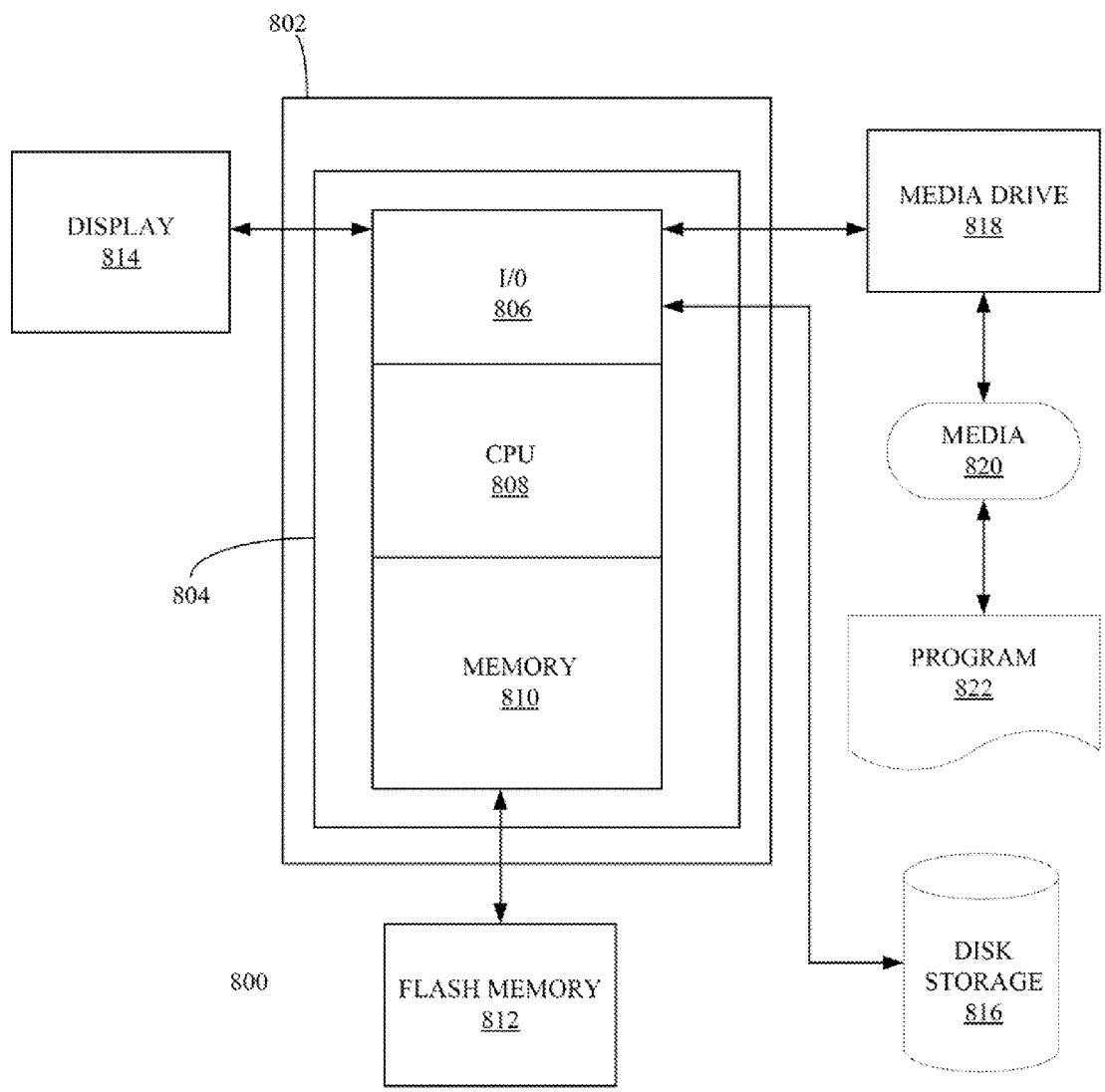
FIG. 8 depicts a computing system with a number of components that can be used to perform any of the processes described herein.

FIG. 8 depicts an exemplary computing system 800 that can be configured to perform several of the processes provided herein. In this context, computing system 800 can include, for example, a processor, memory, storage, and I/O devices (e.g., monitor, keyboard, disk drive, Internet connection, etc.). However, computing system 800 can include circuitry or other specialized hardware for carrying out some or all aspects of the processes. In some operational settings, computing system 800 can be configured as a system that includes one or more units, each of which is configured to carry out some aspects of the processes either in software, hardware, or some combination thereof.

FIG. 8 depicts a computing system 800 with a number of components that can be used to perform any of the processes described herein. The main system 802 includes a motherboard 804 having an I/O section 806, one or more central processing units (CPU) 808, and a memory section 810, which can have a flash memory card 812 related to it. The I/O section 806 can be connected to a display 814, a keyboard and/or other attendee input (not shown), a disk storage unit 816, and a media drive unit 818. The media drive unit 818 can read/write a computer-readable medium 820, which can include programs 822 and/or data. Computing system 800 can include a web browser. Moreover, it is noted that computing system 800 can be configured to include additional systems in order to fulfill various functionalities. Display 814 can include a touch-screen system. In some embodiments, system 800 can be included in and/or be utilized by the various systems and/or methods described herein. As used herein, a value judgment can refer to a judgment based upon a particular set of values or on a particular value system.

Figure 9:
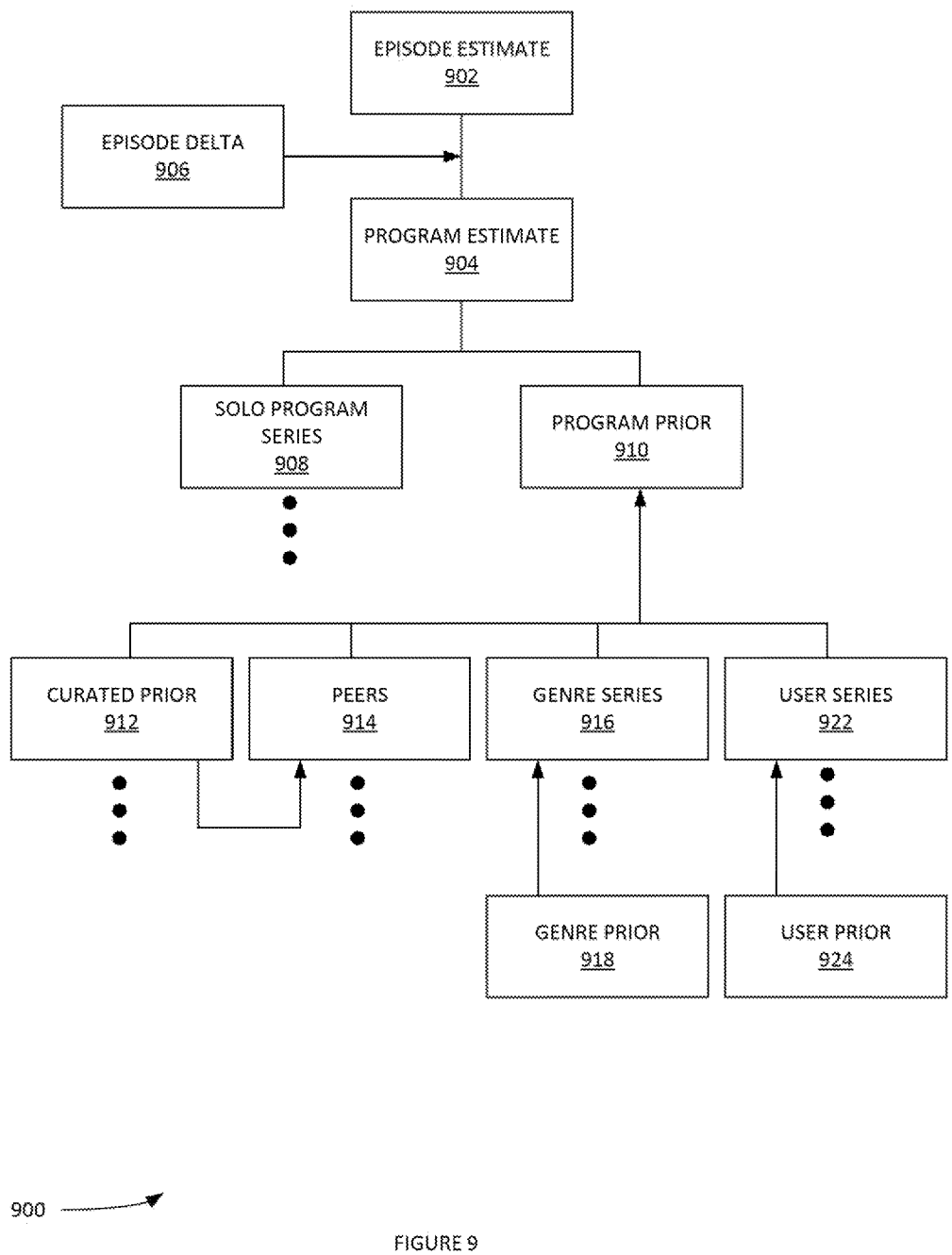
FIG. 9 depicts a tree structure of a system for iteratively autotuning prediction parameters in a media content recommender, according to some embodiments.

FIG. 9 depicts a tree structure 900 of a system for iteratively autotuning prediction parameters in a media content recommender, according to some embodiments. An episode estimate 902 comprises a score for an episode of media content (e.g. a pointer to an episode media content file). Episode estimate 902 can be based on a program estimate 904 and/or an episode delta 906. As used herein, a program can be a production of at least one or more episodes (e.g. a serialized television, podcast and/or radio program). As used in FIG. 9, ellipsis can indicate a temporal series of time-decaying scores for the particular node. The rate of time decay (e.g. can be an exponential decay) can be a configurable attribute of the system that is set according to various factors such as administrator input, user information, user behavior, etc. In this way, more recent scores can carry greater weight than earlier scores. The nodes of tree structure 900 can be represented mathematically. Each node in tree structure 900 can carry a value and a weight. The weight can represent a confidence in the value. If a plurality of nodes is used to calculate the value of another node, the value can be a weighted average of these nodes values.

Episode delta 906 can be a score to be factored into episode estimate 902 based on a collaborative filtering process. For example, a set of users can consume a particular episode of a podcast. An expected score (e.g. an expected weighted average judgment) can be generated for each user (e.g. using each user's historical consumption data). Expected score can be an average of judgments of the user for that program, weighted by time decay, and judgments of other users. As each user consumes the episode, an actual score (e.g. an actual weighted average judgment) can be generated based on the user's behavior. The difference (e.g. the 'delta') between the expected and actual score can be determined for each user. These scores can be averaged to determine the 'episode delta' score for the episode. Media content episodes with higher episode delta values can be 'pushed higher' in a user's sorted media playlist. In this way, a user can be exposed to media content that her peers found interesting.

Program estimate 904 can be a score for the program that includes the episode of episode estimate 902. A program estimate 904 can be determined for each user for each program. Program estimate 904 can be on various factors such as the two branches of tree structure 900 for solo program series 908 and program prior 910.

Solo program series 908 (e.g. a solo judgment) can be a scored based on previous user interactions (e.g. listen events, skip events, etc.). Solo program series 908 can be zero if the user has no previous interactions with the program. As more user interaction with a program are obtained, the solo program series 908 can dominate program prior 910. Program prior 910 can be a score based on factors other than user action with the program.

Program prior 910 can be based on the four nodes: curated prior 912, peers 914, genre series 916 and/or user series 922. Curated prior 912 can be a scored provided by a content manager. Curated prior 912 can be uniform for all users. Peers 914 can be a scored derived from other user peer (e.g. other users with similar attributes) behavior. Peers 914 can be based on collaborative filtering techniques (e.g. such as those provide supra). If no peers are determined for a user, than a curated prior score can be used. This curated prior score can be set by a content manager and/or other system administrator as with curated prior 912.

Genre series 916 can be a genre-based score for the particular genre(s) that include the program (e.g. a business genre, a science genre, an entertainment genre, etc.). Genres that a particular user listened to longer can receive higher scores and thus program prior 910 scores for programs in those genres can receive higher scores accordingly. Genre series 916 can be determined from user listen/skip events for the particular genre. If a user has no listen/skip events for a particular genre, than the genre series 916 score can be derived from genre prior 918. Genre prior 918 can be derived a curator prior (e.g. no social networking profile available for the user) and/or based on information mined from a user's various social networking profiles (e.g. Twitter tag clouds from information extracted from a user's tweets, from a user's Twitter contact's tweets, topic tag cloud, etc.). User series 922 (e.g. a user type) can be a global measure of a user's profile in terms of the user's propensity to listen to or skip through various programs. For example, a user that tends to listen through all the programs provide can have a relatively high user series 922 score due to the fact that a skip event being an anomaly. Conversely, a user can have a tendency to skip through programs. This user can receive a relatively low user series 922 score due to the normative nature of skip events for the user. User series 922 score can be an average of all the judgments a user has made. This score can be included in the program prior 910 score.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it may be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method of managing automated media-content downloads in a preferred network comprising:
    receiving, with a computing device of a user, a sorted list of scored media content episodes, wherein each respective media content episode is scored by an iterative autotuning prediction algorithm, and wherein each element of the sorted list of scored media content episodes comprises a value that represents a likelihood of a user listening to the respective media content episode and a reference to a location of the respective media content episode;
    determining, with at least one processor, a number of bytes of a download iteration for each media content episode based on value that represents a likelihood of the user listening to the respective media content episode and an index of the respective media content episode in the sorted list;
    detecting that the computing device is in the preferred network; and
    implementing the download iteration for each media content episode when it is detected that the computing device is in the preferred network.

2. The method of claim 1 wherein the step of determining the number of bytes of the download iteration for each media content episode based on value that represents the likelihood of the user listening to the respective media content episode and the index of the respective media content episode in the sorted list; further comprises:
    determining a base number of bytes for each media content episode in the sorted list, and
    wherein the base number of bytes of a download iteration for each media content episode comprise the value that represents a likelihood of the user listening to the respective media content episode multiplied by the index of the respective media content episode in the sorted list and the base number of bytes variable.

3. The method of claim 2, wherein the base number of bytes comprises substantially twenty (20) megabytes.

4. The method of claim 1, wherein the preferred network comprises a Wi-Fi network.

5. The method of claim 1 further comprising:
    searching for the preferred network every n-seconds.

6. The method of claim 5, wherein n-seconds comprises substantially ten (10) seconds.

7. The method of claim 1, wherein the step of implementing the download iteration for each media content episode when it is detected that the computing device is in the preferred network further comprises:
    setting a download iteration timer period;
    providing a maximum number of bytes to download during the download iteration timer period.

8. The method of claim 7 further comprising:
    pausing a download iteration when the maximum number of bytes to download during the download iteration timer period is achieved.

9. The method of claim 8 further comprising:
    updating the sorted list of scored media content episodes after the download iteration timer period is reached.

10. The method of claim 9 further comprising:
    determining a download state of each media content episode in the updated sorted list;
    continuing the previous download iteration for any media content episodes already in the updated sorted list with an unchanged value and unchanged index previous download iteration; and
    determining a number of bytes of a download iteration for each new media content episode based on the value that represents the likelihood of the user listening to the respective new media content episode and the index of the respective new media content episode in the updated sorted list.

11. The method of claim 1, wherein the comprises:
    iteratively performing simulations of the user's listening behavior using a set of historical user listening behavior to determine a set of prediction parameters of an episode estimate module based on at least one machine-learning optimization technique;
    calculating an episode estimate score for at least one media content episode, the episode estimate score comprising a score for the media content episode from a weighted-average of an episode delta score, a program estimate score, a solo program series score, a program prior score, curated prior score, a peers score and a genre series score, and wherein the media content score is calculated with respect to the user; and
    sorting the sorted list of scored media content episodes provided to the computing device of the user according to the episode estimate score of each media content episode in the list.

12. A computerized media-content downloading system comprising:
- a processor configured to execute instructions;
- a memory containing instructions when executed on the processor, causes the processor to perform operations that:
    - receives, with a mobile device of a user, a sorted list of scored media content episodes, wherein each respective media content episode is scored by an iterative autotuning prediction algorithm, and wherein each element of the sorted list of scored media content episodes comprises a value that represents a likelihood of a user listening to the respective media content episode and a reference to a location of the respective media content episode;
    - determines, with at least one processor, a number of bytes of a download iteration for each media content episode based on value that represents a likelihood of the user listening to the respective media content episode and an index of the respective media content episode in the sorted list;
    - detects that the mobile device is in the preferred network; and
    - implements the download iteration for each media content episode when it is detected that the mobile device is in the preferred network.

13. The computerized media-content recommender system of claim 12, wherein the memory further contains instructions when executed on the processor, causes the processor to perform operations that:
- determines a base number of bytes for each media content episode in the sorted list.

14. The computerized media-content recommender system of claim 12, wherein the base number of bytes of a download iteration for each media content episode comprise the value that represents a likelihood of the user listening to the respective media content episode multiplied by the index of the respective media content episode in the sorted list and the base number of bytes variable.

15. The computerized media-content recommender system of claim 12, wherein the memory further contains instructions when executed on the processor, causes the processor to perform operations that:
- determines a download state of each media content episode in the updated sorted list;
- continues the previous download iteration for any media content episodes already in the updated sorted list with an unchanged value and unchanged index previous download iteration; and
- determines a number of bytes of a download iteration for each new media content episode based on the value that represents the likelihood of the user listening to the respective new media content episode and the index of the respective new media content episode in the updated sorted list.

16. The computerized media-content recommender system of claim 12, wherein the memory further contains instructions when executed on the processor, causes the processor to perform operations that:
- iteratively performing simulations of the user's listening behavior using a set of historical user listening behavior to determine a set of prediction parameters of an episode estimate module based on at least one machine-learning optimization technique;
- calculating an episode estimate score for at least one media content episode, the episode estimate score comprising a score for the media content episode from a weighted-average of an episode delta score, a program estimate score, a solo program series score, a program prior score, curated prior score, a peers score and a genre series score, and wherein the media content score is calculated with respect to the user; and
- sorting the sorted list of scored media content episodes provided to the mobile device of the user according to the episode estimate score of each media content episode in the list.

17. A method of a media content downloader comprising:
- providing, to a mobile device, a sorted media content playlist comprising a first media content track and a second media content track;
- providing a base number of bytes value;
- determining, with at least one processor, an first alpha score for the first media content track, wherein the first alpha score comprises a likelihood of a user of the computing device listening to the first media content track;
- determining a first beta score for the first media content track, wherein the first beta score is derived from an index of the first media content tract in the sorted list;
- calculating a first number of bytes to download for the first media track by the product of the base number of bytes value, the first alpha score and the first beta score;
- determining, with at least one processor, an second alpha score for the second media content track, wherein the second alpha score comprises a likelihood of the user of the computing device listening to the second media content track;
- determining a second beta score for the second media content track, wherein the second beta score is derived from an index of the second media content tract in the sorted list;
- calculating a second number of bytes to download for the second media track by the product of the base number of bytes value, the second alpha score and the second beta score;
- providing a maximum number of bytes value, wherein the maximum number of bytes value represents a maximum number of total bytes to download for both the first media content track and second media content track in a media content download operation;
- detecting that the computing device has accessed a preferred computer network; and
- implementing, when it is detected that the computing device has accessed the preferred computer network, the media content download operation until the maximum number of bytes value has been reached or the first number of bytes to download for the first media track and the second number of bytes to download for the second media track have been downloaded.

18. The method of claim 17 further comprising:
- checking to ensure that the computing device remains in the preferred computer network; and
- pausing the media content download operation when it is detected that the computing device is no longer in the preferred computer network.

19. The method of claim 17:
- wherein the first index of the first media track is one and wherein the first beta score is 1, and
- wherein the second index of the second media track is two and wherein the second beta score is 0.5.

20. The method of claim 17:
- wherein the step of detecting that the computing device has accessed a preferred computer network is performed once in a specified period of time, and wherein the likelihood of the user of the computing device listening to the first media content track and the likelihood of the user of the computing device listening to the second media content track determined by a process of iteratively autotuning a set of specified prediction parameters associated with the user with a media content recommendation system.

* * * * *

UNITED STATES PATENT AND TRADEMARK OFFICE
CERTIFICATE OF CORRECTION

| | |
|---|---|
| PATENT NO. | : 9,224,105 B2 |
| APPLICATION NO. | : 14/070583 |
| DATED | : December 29, 2015 |
| INVENTOR(S) | : Chris Cornelius et al. |

Page 1 of 1

It is certified that error appears in the above-identified patent and that said Letters Patent is hereby corrected as shown below:

In the claims:
Column 12, clm 11, line 50: Replace the phrase "wherein the comprises" with the phrase --further comprising--;
Column 13, clm 12, line 4: Insert --, which-- after the phrase "containing instructions";
Column 13, clm 12, line 5: Replace the word "causes" with the word --cause--;
Column 13, clm 12, line 7: Replace the word "receives" with the word --receive--;
Column 13, clm 12, line 16: Replace the word "determines" with the word --determine--;
Column 13, clm 12, line 22: Replace the word "detects" with the word --detect--;
Column 13, clm 12, line 24: Replace the word "implements" with the word --implement--;
Column 13, clm 13, lines 28-29: Insert --, which-- after the phrase "contains instructions";
Column 13, clm 13, line 29: Replace the word "causes" with the word --cause--;
Column 13, clm 14, line 31: Replace the word "determines" with the word --determine--;
Column 13, clm 15, lines 41-42: Insert --, which-- after the phrase "contains instructions";
Column 13, clm 15, line 42: Replace the word "causes" with the word --cause--;
Column 13, clm 15, line 44: Replace the word "determines" with the word --determine--;
Column 13, clm 15, line 46: Replace the word "continues" with the word --continue--;
Column 13, clm 15, line 50: Replace the word "determines" with the word --determine--;
Column 13, clm 16, lines 57-58: Insert --, which-- after the phrase "contains instructions";
Column 13, clm 16, line 58: Replace the word "causes" with the word --cause--;
Column 13, clm 16, line 58: Replace the word "performing" with the word --perform--;
Column 14, clm 16, line 3: Insert --a-- before the phrase "curated prior score";
Column 14, clm 17, line 16: Replace the word "an" with the word --a--;
Column 14, clm 17, line 22: Replace the word "tract" with the word --track--;
Column 14, clm 17, lines 23-24: Insert --content-- after the phrase "for the first media";
Column 14, clm 17, line 26: Replace the word "an" with the word --a--;
Column 14, clm 17, line 33: Replace the word "tract" with the word --track--;
Column 14, clm 17, lines 35-36: Insert --content-- after the phrase "for the second media";
Column 14, clm 19, line 60: Insert --content-- after the phrase "of the first media";
Column 14, clm 19, line 62: Insert --content-- after the phrase "of the second media".

Signed and Sealed this
Fifth Day of July, 2016

Michelle K. Lee
*Director of the United States Patent and Trademark Office*